Dec. 18, 1934.  T. L. COLE ET AL  1,984,864
REVOLVING TEST PLUG
Filed March 22, 1932
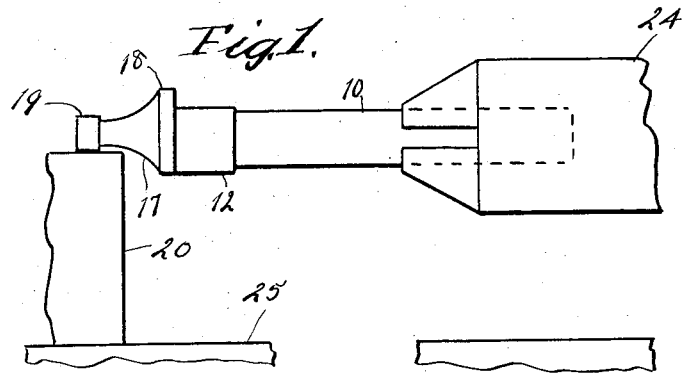
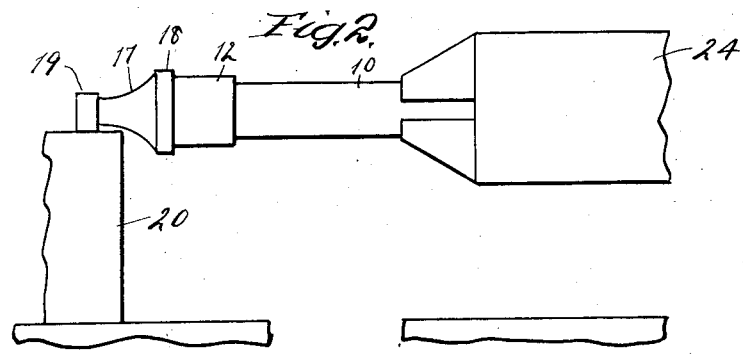
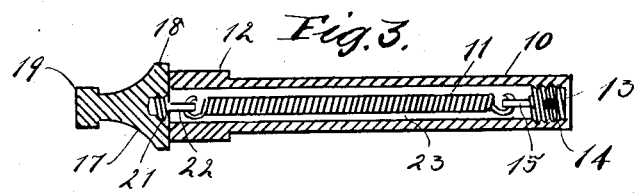
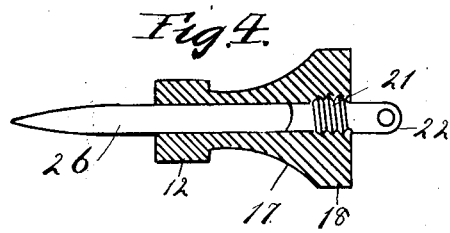
Inventors
Thomas L. Cole and
Andrew J. Kinsella
By W. W. Williamson Atty.

Patented Dec. 18, 1934

1,984,864

UNITED STATES PATENT OFFICE 1,984,864

REVOLVING TEST PLUG

Thomas L. Cole and Andrew J. Kinsella, Norristown, Pa.

Application March 22, 1932, Serial No. 600,396

4 Claims. (Cl. 33—169)

Our invention relates to new and useful improvements in revolving test plugs, and has for its object to provide an exceedingly simple and effective device of this description by which work to be done in milling machines or boring machines and the like may be accurately positioned relative to the tools being used in such machines.

A further object of the invention is to so construct such a device that the tension upon the movable member may be increased or decreased as occasion may require.

A still further object of the invention is to provide for the insertion of a pointer within the movable member for positioning the work from lines previously drawn on such work.

With these and other ends in view, this invention consists in the details of construction and combination of elements hereinafter set forth and then specifically designated by the claims.

In order that those skilled in the art to which this invention appertains may understand how to make and use the same, we will describe its construction in detail, referring by numerals to the accompanying drawing forming a part of this application, in which:—

Fig. 1 is a fragmentary view of a machine showing our improved revolving test plug held in the chuck of said machine for positioning work upon the bed of said machine, the movable member of the plug being shown out of line with the axial center of the plug.

Fig. 2 is a view similar to Fig. 1, showing the movable member of the test plug in a central position.

Fig. 3 is a central longitudinal section of the test plug showing the construction thereof.

Fig. 4 is an enlarged view of the movable member of the plug showing a pointer set therein.

In carrying out our invention as herein embodied, 10 represents the body of the test plug which is tubular in shape, having a space 11 in the interior thereof and a slightly enlarged head 12 formed upon one end. 13 represents a headless screw for screwing into the threads 14 formed in the rear end of the body and this screw carries an eye 15 projecting inwardly therefrom.

17 represents the movable member of the plug, the base 18 of which is preferably of greater diameter than the diameter of the head 12 and this head has the button 19 formed thereon which latter is intended to contact with the work 20 for the purpose hereinafter set forth.

21 represents a screw threaded into the movable member and having an eye 22 projecting inward therefrom so that the coiled spring 23 may be attached thereto, the opposite end of said spring being attached to the eye 15 as clearly shown in Fig. 3. This arrangement causes the spring to hold the movable member firmly against the face of the head 12, while at the same time permitting it to have a universal side wise movement relative to said head.

The screw 13 is provided with a suitable slot for the application of a screw driver whereby said screw may be threaded inwardly or downwardly to decrease or increase the tension upon the spring 23, thereby decreasing or increasing the pull upon the movable member so as to regulate the force with which the movable member is held against the face of the head 12. In practice, the test plug is inserted in the chuck 24 of a milling or boring machine and the bed 25 of said machine upon which the work is mounted is first raised to bring the work into contact with the button 19 sufficiently to force the movable member out of true with the head 12, after which the bed is gradually lowered until the movable member runs true with the axial line of the body, thus accurately determining the distance of the upper surface of the work from the center of the chuck which distance will be equal to the radius of the button and this radius is a known quantity. After this has been accomplished the test plug is removed from the chuck and a boring tool substituted therefor or the chuck holding the test plug is removed from the spindle of the machine and a boring or cutting tool inserted in said spindle; when by raising the bed a distance equal to the measurement from the upper surface of the work to a point where the cutting or boring is to be accomplished plus the measurement of the radius of the button, the work will be accurately positioned for the machining operation.

When the test plug is to be used in a vertical boring machine, the same method is followed in locating the work except that the work is then moved horizontally instead of vertically to bring it into proper position.

In Fig. 4 we have shown a slight modification in which the movable member 17 has a central socket for the reception of a pointer 26 which is readily insertable in said socket or removable therefrom, and when in place this pointer facilitates the positioning of work relative to the center of the spindle, since it is only necessary to raise or lower the bed of the machine until the pointed end of the pointer exactly coincides with the previously marked lines showing the center at which the machining operation is to be performed.

By our improvement, an exceedingly simple and effective test plug is provided, the principal feature of which is that the movable member thereof has a universal movement relative to the head of the test plug on lines always parallel with the face of said head and therefore in no way distorts the locating of the positon of the work; with the further advantage that the tension with which said movable member is seated upon the face of the head may be varied to conditions under which the plug is being used.

Of course we do not wish to be limited to the exact details of construction as herein shown, as these may be varied within the limits of the appended claims without departing from the spirit of our invention.

Having thus fully described our invention, what we claim as new and useful is:—

1. In a revolving test plug, a hollow body, a movable member seated against one end of said body, an adjusting screw carried by the opposite end of said body, and a coil spring within the hollow body having one end connected with the movable member and the opposite end with the adjusting screw, the tension of said spring being variable by a change in position of the screw.

2. In a revolving test plug, a hollow body having threads on the inside at one end thereof, a movable member seated against the opposite end of the body, a coil spring located within the body and having one end attached to the movable member, and a screw to which the other end of said spring is attached, said screw being mounted in the threaded end of the body for longitudinal adjustment in said body to vary the tension of the spring for regulating the force with which the movable member is held against the body.

3. In a revolving test plug, a hollow body, a movable member seated against one end of said body and having a bore in the end opposite the seating end, an instrument removably mounted in said bore, an adjusting screw having threaded connection with the end of the body opposite the seating end, said screw being adjustable longitudinally of the body, and a coil spring within said body attached to the movable member and the adjusting screw.

4. A revolving test plug comprising a hollow cylindrical body with a bore extending entirely therethrough and having a contact face at one end while the other end is internally threaded, an adjusting screw mounted in the internally threaded end of the body, an eye carried by said screw, a movable member seated against the contact face of the body, an eye carried by said member, a spring attached to the eyes to hold the movable member in engagement with the contact face and the tension of said spring being variable by a change in position of the screw.

THOMAS L. COLE.
ANDREW J. KINSELLA.